(12) United States Patent
Padden

(10) Patent No.: US 8,789,278 B2
(45) Date of Patent: Jul. 29, 2014

(54) METHOD OF FORMING A COMPOSITE LINK FITTING

(71) Applicant: Blair HSM Composites LLC, Medford, NY (US)

(72) Inventor: Vincent Padden, Stuart, FL (US)

(73) Assignee: Blair HSM Composites LLC, Medford, NY (US)

( * ) Notice: Subject to any disclaimer, the term of this patent is extended or adjusted under 35 U.S.C. 154(b) by 0 days.

(21) Appl. No.: 14/028,650

(22) Filed: Sep. 17, 2013

(65) Prior Publication Data

US 2014/0014256 A1   Jan. 16, 2014

Related U.S. Application Data

(62) Division of application No. 13/225,982, filed on Sep. 6, 2011, now Pat. No. 8,544,361.

(51) Int. Cl.
| | |
|---|---|
| *B21D 53/84* | (2006.01) |
| *B21D 39/00* | (2006.01) |
| *B23P 11/00* | (2006.01) |
| *F16C 7/00* | (2006.01) |
| *F16C 7/02* | (2006.01) |

(52) U.S. Cl.
USPC ........... 29/897.2; 29/888.09; 29/548; 29/509; 29/514; 29/525.01; 29/411; 29/904; 29/DIG. 1; 74/579 R; 74/579 E; 156/250

(58) Field of Classification Search
CPC ....... B21K 1/766; B23P 15/00; B23B 38/185; B32B 38/18; B32B 38/1883; B32B 37/00; B32B 38/04; F16C 7/02; F16C 7/04; F16C 7/00; F16C 7/01; F16C 7/03; F16C 7/05; F16C 7/06; F16C 7/07; F16C 7/08; F16C 7/026; B60G 7/00
USPC ........ 29/888.09, 888.091, 888.092, 411, 458, 29/460, 469, 509, 514, 525.01, 904, 29/DIG. 1; 74/579 R, 579 E, 581–594; 123/197.3, 197.4; 156/250; 280/124.128–124.131, 124.134, 93.51; 428/192, 131
See application file for complete search history.

(56) References Cited

U.S. PATENT DOCUMENTS

| | | | | | |
|---|---|---|---|---|---|
| 14,302 | A | * | 2/1856 | Blaikie et al | 74/594 |
| 1,166,206 | A | * | 12/1915 | Heaslet | 403/157 |
| 1,828,891 | A | * | 10/1931 | Crawford et al. | 403/135 |
| 3,279,278 | A | * | 10/1966 | Eldred | 74/579 R |
| 3,768,334 | A | * | 10/1973 | Ditlinger | 74/579 R |

(Continued)

*Primary Examiner* — Sarang Afzali
(74) *Attorney, Agent, or Firm* — The Marbury Law Group, PLLC

(57) ABSTRACT

A method of forming a composite link fitting including joining two opposed bearing supports with an inner laminate core having a longitudinal axis extending there between. Each bearing support including a bearing bore formed as an aperture, a first stepped portion, a separate second stepped portion and a recess formed therein. The recess extending toward the bearing bore between an extent of the first and second stepped portions to a recess bottom. The inner laminate core including a central elongate layer, a first outer layer and a second outer layer, with the first and second outer layers disposed on opposed first and second sides of the central elongate layer. First and second ends of the central elongate layer disposed within respective recesses. Also, the method including wrapping an outer band around the two bearing supports and the inner laminate core to form the composite link fitting.

18 Claims, 4 Drawing Sheets

(56) References Cited

U.S. PATENT DOCUMENTS

| | | | | |
|---|---|---|---|---|
| 3,822,609 A | * | 7/1974 | Kotoc | 74/579 E |
| 3,826,155 A | * | 7/1974 | Muller | 74/519 |
| 4,120,998 A | * | 10/1978 | Olez | 428/33 |
| 4,300,410 A | * | 11/1981 | Raghupathi et al. | 74/579 R |
| 4,572,058 A | * | 2/1986 | Hinz et al. | 92/187 |
| 5,016,807 A | * | 5/1991 | Haack | 228/170 |
| 5,613,334 A | * | 3/1997 | Petrina | 52/223.1 |
| 6,116,113 A | * | 9/2000 | Pazdirek et al. | 74/579 R |
| 6,382,081 B2 | * | 5/2002 | Tanaka et al. | 92/128 |
| 7,281,449 B2 | * | 10/2007 | Harimoto et al. | 74/579 E |
| 2010/0047613 A1 | * | 2/2010 | Padden | 428/614 |

* cited by examiner

METHOD OF FORMING A COMPOSITE LINK FITTING

RELATED APPLICATIONS

This application is a divisional application of U.S. Non-Provisional application Ser. No. 13/225,982 filed Sep. 6, 2011, now U.S. Pat. No. 8,544,361 entitled "COMPOSITE LINK FITTING," the entire contents of which are hereby incorporated by reference.

BACKGROUND

The present disclosure relates to a composite link fitting and manufacture of same. More particularly, the present disclosure relates to a light weight low cost link fittings made primarily from composite materials for aerospace applications.

Control rod fittings, also known as "link fittings," are extensively used in aerospace structures for many applications. Such link fittings are employed to transfer heavy and/or concentrated loads between two separate structures or portions of a structure. Generally, minimizing weight, providing long term durability, such as avoiding metal fatigue, increasing damage tolerance and resisting corrosion, while maintaining low cost are desirable to the aerospace industry. However, achieving low weight, low cost and long term durability is a significant challenge to designers.

Accordingly, it would be desirable to provide a control rod fitting and method of manufacturing same that is efficient, cost effective and overcomes the various shortcomings of the prior art.

SUMMARY

An embodiment includes a method of forming a composite link fitting. The method includes joining two opposed bearing supports with an inner laminate core having a longitudinal axis extending there between. Each bearing support includes a bearing bore, a first stepped portion, a separate second stepped portion and a recess formed therein. The bearing bore is formed as an aperture extending from one side of each bearing support to an opposed side of the bearing support. The recess extends toward the bearing bore between an extent of the first and second stepped portions to a recess bottom, wherein between the recess bottom and an inner wall of the bearing bore a bearing support thickness separates the bearing bore from the recess. The inner laminate core includes a central elongate layer, a first outer layer and a second outer layer. The first and second outer layers are disposed on opposed first and second sides of the central elongate layer. Also, the first outer layer engages the first side of the central elongate layer and a portion of the first stepped portion on each of the two bearing supports. Additionally, the second outer layer engages the second side of the central elongate layer and a portion of the second stepped portion on each of the two bearing supports. The central elongate layer includes longitudinally opposed first and second ends, where the first end is disposed within the recess of one of the two bearing supports and the second end is disposed within the recess of the other of the two bearing supports. Additionally, the method includes wrapping an outer band around the two bearing supports and the inner laminate core to form the composite link fitting.

These and other aspects, objectives, features and advantages of the disclosed technologies will be apparent from the following detailed description of illustrative embodiments thereof, which is to be read in connection with the accompanying drawings.

BRIEF DESCRIPTION OF THE DRAWINGS

The accompanying drawings, which are incorporated in and constitute a part of this disclosure, illustrate embodiments of the disclosure, and together with a general description of the disclosure given above, and the detailed description of the embodiments given below, serve to explain the principles of the present disclosure.

DETAILED DESCRIPTION

Figure 1:
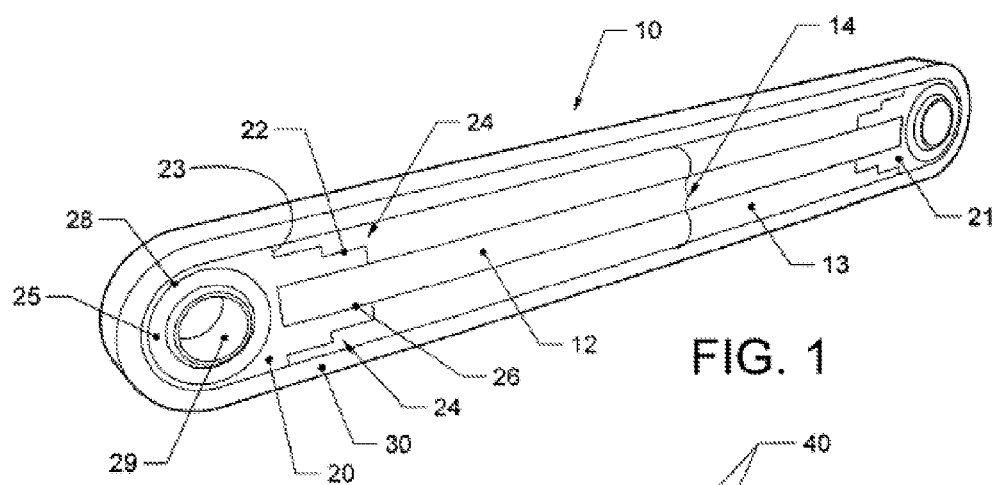
FIG. 1 is a perspective view of a composite link fitting in accordance with aspects of the disclosed technologies.

Reference is now made to the drawings, in which like reference numerals identify identical or substantially similar parts throughout the several views.

A single composite link fitting 10 is illustrated in FIG. 1 in accordance with aspects of the present disclosure. The link fitting 10 includes bearing supports 20, 21 disposed at two opposed ends of the fitting 10. Between the bearing supports 20, 21 is an inner laminate core 14 formed from a layered subassembly of a plurality of discrete laminate bands 11, 12, 13. Each of the discrete laminate bands is also referred to herein as a "laminate," since they are each formed from multiple layers of thin plies bonded with adhesive. Also, the link fitting 10 includes an outer laminate band 30 that wraps around the perimeter of the inner laminate core 14 and the bearing supports 20, 21. It should be understood that all lengths and proportions illustrated in the drawings herein can be adjusted to suit particular application needs.

As will be appreciated from the detailed explanation provided below, the transfer of concentrated loads into or through the composite link fitting 10 can be successfully achieved while minimizing a compromise of the structural integrity of the composite layers 11, 12, 13, 30 or the bearing supports 20, 21. The composite link fitting 10 described herein provides a relatively light weight and durable structure as compared to contemporary similarly sized link fittings.

The distribution of loads between the bearing supports 20, 21 and the outer band 30 is influenced by the stiffness of these elements at the lug net section. A load distribution balance in the link fitting 10 is achieved by having the proper thickness ratio between the thickness of the bearing support 20, 21 at the lug net section and the thickness of the outer band 30 at the lug net section. The optimization of this ratio and resulting configuration depend on the specific application and results in the efficient transfer of axial load with no gapping between the bearing supports 20, 21 and the composite plies 12, 14, thus maintaining joint integrity.

Using the apparatus and methods disclosed herein, metallic bearing supports 20, 21 can be used to efficiently transfer concentrated loads through composite materials 11, 12, 13, 30. The bearing supports 20, 21 can be titanium or other material of suitable strength for transferring working loads through the link fitting 10. The resulting link fitting is comparable generally in form and performance to the material used for the lug of a conventional metallic end fitting. However, the link fitting in accordance with the disclosed technologies herein is generally lighter than conventional designs and durable, which is desirable.

The bearing supports 20, 21 each can include two separate stepped portions 24, a curved outer portion 25, a center recess 26 and a bearing bore 28 extending from one lateral side of the bearing support 20, 21 to an opposed lateral side thereof. Only one lateral side is visible in the link fitting 10 shown in FIG. 1, but it should be understood that the opposed lateral side would look the same, since the overall link fitting 10 is symmetrical.

The bearing bore 28 generally receives a bearing for holding a bolt, pin or other structure for introducing tensile or compressive loads to the link fitting 10. In this way, the link fitting 10 is coupled to separate adjacent structures at each of the bearing bores 28 of the two bearing supports 20, 21. The bearing bore 28 can hold a bushing or spherical bearing 29 therein, in order to minimize wear on the bearing bore 28 when a bolt, rod or other structure is received therein. Alternatively, the bearing bore 28 can hold a different bearing support substructure or be mounted directly to another assembly. The stepped portions 24 of the bearing supports 20, 21 symmetrically project away from the bearing bore 28, with the flat surfaces 22 generally parallel to a longitudinal axis of the link fitting 10. Such a longitudinal axis extends through the center of each bearing bore 28 and each center recess 26 of the two bearing supports 20, 21. The curved outer portion 25 can have a constant thickness along its entire extent, measured from an inner wall of the bearing bore 28.

Figure 2:
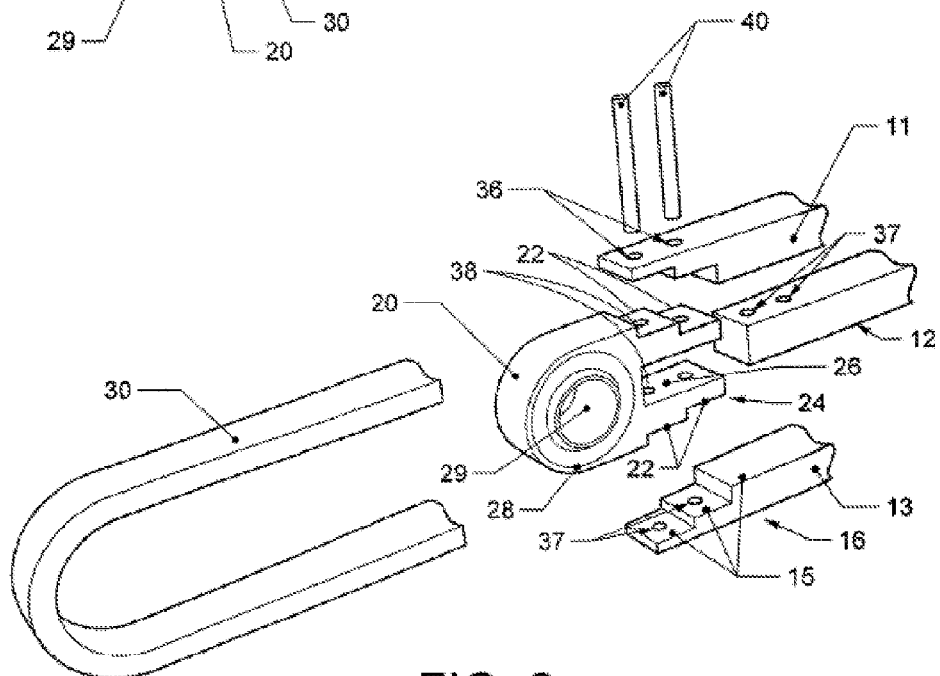
FIG. 2 is an exploded perspective view of the left portion of the composite link fitting of FIG. 1.

FIG. 2 shows an exploded view of the left side of the composite link fitting 10 from FIG. 1. It should be understood that while only bearing support 20 is shown in FIG. 2, the other bearing support 21 preferably has a similar design. As the bearing supports 20, 21 are symmetrical along a plane splitting the center recess 26, the two supports 20, 21 can be identical. However, an alternative non-symmetrical design would mean the two supports 20, 21 should be mirror opposites of one another. The bearing supports 20, 21 each include two separate sets of steps defining two stepped portions 24. The "stepped portion" 24 refers to a series of flat surfaces 22 at different levels relative to one another, connected by risers 23 between adjacent levels, forming a stair-like configuration. Once the link fitting is assembled, the stepped portions 24 each engage an end of one of the two outer layers 11, 13 of the inner laminate core. The set of flat surfaces 22 joined by risers 23 that form a continuous outer portion of the bearing supports 20, 21 define a single stepped portion 24. Each of the bearing supports 20, 21 has at least two stepped portions 24, configured such that the flat surfaces 22 of the separate stepped portions 24 face away from each other, while generally extending parallel to one another. Additionally, between the two stepped portions 24 is a center recess 26 for receiving an end portion of a central elongate layer 12 of the inner laminate core.

According to one aspect of the disclosed technologies, each bearing support 20, 21 has a symmetric design relative to the center recess 26, which coincides with a central longitudinal axis of the overall link fitting 10. The stepped portions 24 and the center recess 26 can be machined into each bearing support, extruded or formed by other means. Additionally, the bearing supports 20, 21 are each provided with a curved outer portion 25. Relative to a bearing bore 28 of the bearing supports 20, 21 the curved outer portion 25 is generally disposed opposite to the stepped portions 24 and the center recess 26. A top step from each of the stepped portions 24 merges continuously and seamlessly into opposed sides of the curved outer portion 25 on each bearing support 20, 21.

An inner laminate core 14 is formed from three generally flat composite laminates 11, 12, 13. Each of the individual laminates 11, 12, 13 can be formed from a layered arrangement of graphite and epoxy, made to form an elongate laminate structure having a generally rectangular cross-section. Particular laminate compositions, such as using Boron Epoxy, Graphite Epoxy or Fiberglass pre-impregnated tape or woven fabric, can be suitable for their material properties and characteristics. In forming the inner laminate core, each laminate 11, 12, 13 forms a distinct layer of the inner laminate core. In this way, the laminates 11, 12, 13 are stacked alongside one another so that two outer laminates 11, 13 engage opposite sides of the central laminate 12. The laminates 11, 12, 13 are also referred to herein as "layers". While a laminate and/or composite construction is preferred for the laminates 11, 12, 13, it should be understood that a non-laminate and/or non-composite construction could alternatively be used.

Each of the laminates 11, 12, 13 of the inner laminate core has an axial end that engages a bearing support 20, 21. In fact, opposed axial ends of each laminate 11, 12, 13 engage the two opposed bearing supports 20, 21. In this way, the axial ends of the outer laminates 11, 13 are seated on the stepped portions 24, while the axial ends of the central laminate 12 being disposed in the center recess 26. Preferably, the central laminate 12 has a thickness that corresponds to the gap forming the center recess 26. Thus, an axial end of the central laminate 12 should fill the center recess 26 when seated therein and butt up against the bottom of the recess for receiving compressive link fitting loads between the bearings. The outer laminates 11, 13 can be formed with a graded taper 16 at each axial end thereof. Such a graded taper 16 preferably complements the stepped outer portion 24 to which it engages. In this way, the graded tapers 16 of each outer laminate 11, 13 include flat surfaces 15 made to engage the flat surfaces 22 of the stepped portions when assembled. Accordingly, the rise between adjacent grades of the graded taper 16 should match the height of the corresponding risers 25 of the stepped portion. Alternatively, the outer layers 11, 13 can each be formed from a greater number of discrete elongate laminates each having a thickness corresponding to the height of the risers 25. For example, the outer layers 11, 13 shown in FIGS. 1 and 2 can each be formed from three distinct layered laminates of different heights and lengths, with the shortest laminate directly engaging and having the same length as the central laminate 12. Thus, the plane in which each step 22 respectively resides is spaced from the plane in which a step 22 adjacent thereto resides by a predetermined distance, the predetermined distance being at most equal to the predetermined thickness of each of three discrete layered laminates forming one of the outer layers. The thicknesses of the center core laminates 11, 12, 13 should allow for a layer of adhesive at each of the corresponding interfaces of the bearing supports 20, 21. The adhesives (not shown) should be selected, as suited for the intended environment of the link fitting. For example, the adhesive FM® 300, by Cytec Industries Inc. of Woodland Park, N.J. can function at temperatures between −67° to 300°

F. Bismaleimide (BMI) resins can also be used to resist temperatures as high as 400° F. or even 450° F. for shorter durations.

The outer band 30 can be formed from a similar laminate composition as that of the inner laminate core. However, since the outer band 30 wraps around the bearing supports 20, 21 and the inner laminate core, it can be formed from different materials from the inner laminate core, which have a generally planar extent. For example, the outer band 30 could be designed to be more flexible or elastic than the inner laminate layers.

A link fitting 10 can be assembled in various ways. One technique pre-forms the inner laminate core 14 by sandwiching a central laminate 12 between two outer laminates 11, 13. In one embodiment, the length of all three laminates 11, 12, 13 is the same, even though the outer laminates 11, 13 already have their graded tapers 16 at opposed ends. A bearing support 20, 21 is then fitted to opposed longitudinal ends of the bonded inner laminate core 14. In this way, the opposed longitudinal ends of the central laminate 12 are seated within the center recesses 26 of the two opposed bearing supports 20, 21. A width (W) of the center recess 26 should closely match the thickness of the central laminate 12. Also, if all the layers 11, 12, 13 of the inner laminate core 14 have the same length, then a depth (d) of the center recess 26 should match the combined lengths of the flat surfaces 22 of a single stepped portion 24. In this way, the graded tapers 16 of the outer laminates 11, 13 should be seated on the stepped portions 24 of the bearing supports 20, 21. As each of the outer laminates 11, 13 has graded tapers at opposite longitudinal ends, each of the outer laminates 11, 13 engages the stepped portions 24 of the two opposed bearing supports. Before mating the inner laminate core 14 and the bearing supports 20, 21, a bonding adhesive can be applied to hold this subassembly together.

Alternatively, the bearing supports 20, 21 and the inner laminate core 14 can be mated before curing of the inner laminate core layers 11, 12, 13. In this way, opposed ends of the central laminate 12 can first be inserted into the center recess 26 of the two opposed bearing supports 20, 21. Thereafter, the outer laminates 11, 13 are made to engage the stepped portions 24 and opposed planar surfaces of the central laminate 12. This fabrication sequence can be carried out with the aid of one or more assembly tools. Also, adhesive is applied between engaging surfaces of the layers 11, 12, 13, as well as the center recess 26 and the stepped portions 22 of the bearing supports 20, 21.

Once the inner laminate core 14 and the two bearing supports 20, 21 are mated, one or more securing pins 40 are inserted through a portion of the assembly where the inner laminate core 14 and the bearing support 20, 21 overlap. In this way, a securing pin 40 extends through the following:

aperture 36 of the outer laminate 11 (disposed on a level grade 15 of the graded taper 16 thereof);
an aperture 38 in one leg of the bearing support corresponding to one of the two stepped portions 24;
an aperture 37 in the central laminate 12;
another aperture 38 in the other leg of the bearing support corresponding to the other stepped portion 24; and
aperture 39 in the other outer laminate 13 (through a corresponding level grade 15 of the graded taper 16 thereof). It should be understood that the securing pin can be inserted from bottom to top, rather than top to bottom as described above. Thus, each element through which the securing pin 40 extends has a securing pin aperture 36, 37, 38, 39 for each securing pin used. As shown in FIG. 2, each end of the inner laminate core 14 and each bearing support 20, 21 include holes for two securing pins 40. Such holes can be pre-drilled or formed after the inner laminate core 14 and the two bearing supports are mated. The securing pins 40 can be metal, such as titanium, and should be of suitable strength to endure the shear loads placed upon them by the link fitting 10 under working loads.

Once the securing pins 40 are installed in the inner laminate core 14 and the bearing supports 20, 21, the outer band 30 is installed and bonded to complete the assembly. The outer band 30 can be formed from the same composite material as the inner laminate layers 11, 12, 13. Similarly, the adhesive used to bond the outer band 30 to the subassembly can be the same as that used to assemble the subassembly. The outer band 30 can be a single layer or a plurality of layers wrapping around the inner subassembly. The outer band can be fabricated as a continuous wrap or by wrapping segmented plies butt-spliced together, in order to form a continuous outer band 30. Also, where a plurality of layers for the outer band 30, the butt splice for each layer should be staggered or in an offset sequence relative to other layers of the outer band 30.

Figure 4:
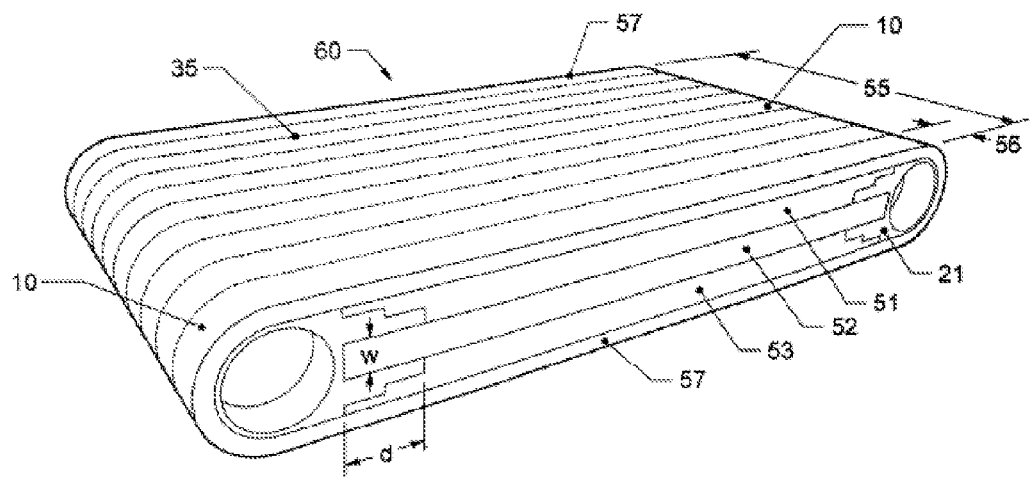
FIG. 4 is a perspective view of a blank for forming a series of composite link fittings in accordance with aspects of the disclosed technologies.

While a composite link fitting 10 can be formed by various means, aspects of the disclosed technologies also include further methods of manufacturing one or more such link fittings. To reduce costs, the assembly process can create a blank 60 forming an extra wide assembly that gets subsequently cut to the size of individual links 10. The blank 60 of individual link fittings 10 can be integrally bonded as shown in FIG. 4. In this way, many individual composite link fittings 10 can be created efficiently and in a cost effective manner.

Figure 3:
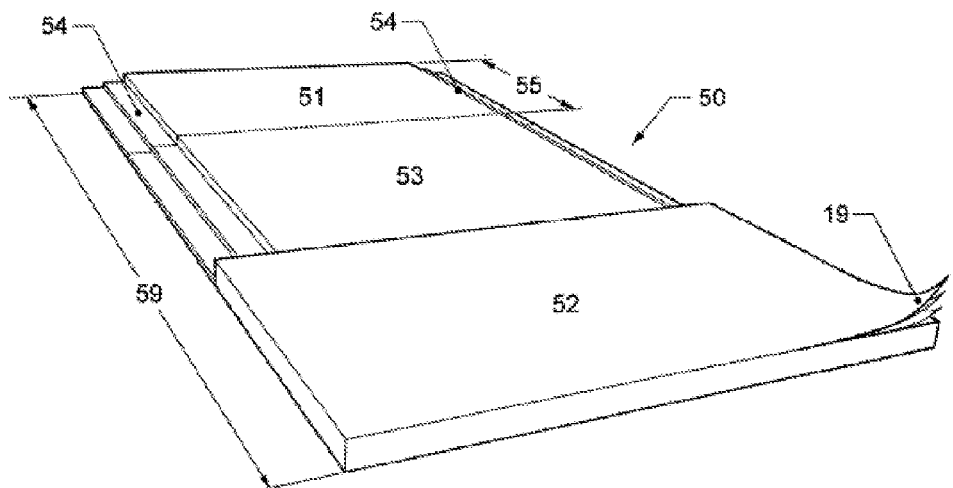
FIG. 3 is a perspective view of a flat panel used for assembling a series of composite link fittings in accordance with aspects of the disclosed technologies.

FIG. 3 shows an early stage for forming a series of inner laminate cores 14 for multiple link fittings 10, in accordance with a further aspect of the disclosed technologies. A preassembled laminate structure 50 is formed as a planar web, preferably having a thickness and length that corresponds to the thickness and length of each of the laminates 11, 12, 13 of the inner laminate core 14. The preassembled laminate structure 50 is formed from a number of individual plies 19. The plies 19 can be made from prepreg graphite tape or fabric and/or fiberglass or other suitable materials. Also, the plies 19 can be generally smooth, solid and planar.

The laminate structure 50 once formed will be machined into three separate layer blanks 51, 52, 53 that correspond to a series of simultaneously constructed laminates 11, 12, 13, respectively. Each layer blank 51, 52, 53 has the same width 55, so the base preassembled laminate structure 50 should have a larger width 59 that is three times the width 55 of the individual layer blanks 51, 52, 53. Two of the layer blanks 51, 53 are machined to correspond to the outer layers 11, 13, which have graded tapers 16. Accordingly, two-thirds of the full width 59 of the preassembled laminate structure 50 corresponds to the two layer blanks 51, 53. That two-thirds portion gets machined to form extended graded tapers 54 along opposed edges. FIG. 3 illustrates one edge that includes an extended graded taper 54, but it should be understood that the opposed edge (facing the top right corner of the page) includes a similar extended graded taper 54. As the individual layer blanks 51, 52, 53 are eventually separated from one another, the machining of the extended graded tapers 54 for the two-thirds portion can be performed after that portion is separated from the other portion 52 corresponding to the central laminates 12. Alternatively the extended graded tapers 54 can be added before any of the layer blanks 51, 52, 53 are separated or individually after they are all separated. Regardless, the three layer blanks 51, 52, 53 are eventually separated and cut to each have the same width 55.

Thereafter, the separate three layer blanks 51, 52, 53 are stacked and mated to a series of bearing supports 20, 21. As with the laminates 11, 12, 13, the layer blanks get stacked such that a central blank 52 is sandwiched between outer blanks 51, 53. This stacked configuration should have the extended graded tapers 54 of each outer blank 51, 53 facing the other. As with the method of forming a single link fitting 10, described above, the three layer blanks 51, 52, 53 can be stacked before mating with the bearing supports 20, 21 or the central blank 52 can be mated with the bearing supports 20, 21 before adding the outer blanks 51, 52 to opposed sides of the central blank 52 and matingly engaging the extended graded tapers 54 with the stepped portions 24 of the bearing supports 20, 21.

By mating a series of bearing supports on opposed sides of the stacked layered blanks 51, 52, 53, a main link blank 60 is formed. One method of assembling the blank 60, includes lining-up two rows of discrete bearing supports 20, 21, with the center recesses 26 of one row of bearing supports 20 facing the center recesses of the other row of bearing supports 21. In each row, each bearing support 20, 21 has at least one lateral side engaging an adjacent bearing support in the same row. For example, the link blank 60 shown in FIG. 4, once cut along the nine (9) separation lines 35, forms ten (10) individual link fittings 10. Thus, ten (10) bearing supports 20 would be laterally lined-up for mounting on a common edge of the stacked layered blanks 51, 52, 53 and ten (10) other bearing supports 21 would be laterally lined-up for mounting on a common opposed edge of the stacked layered blanks 51, 52, 53. The bearing supports 20, 21 can be placed into a tooling fixture or assembly jig in order to hold and align so many parts for assembly. Each of the sets of laterally lined-up bearing supports 20, 21 would have their bearing bores aligned, as well as their stepped portions 24. In this way, while the stacked layered blanks 51, 52, 53 need to be separated, the cutter need not cut through the bearing supports 20, 21, which can be formed from harder material. A second alternative method that forms a link blank 60 uses an extended width bearing support, analogous to the extended width of the layer blanks 51, 52, 53 relative to the laminates 11, 12, 13. For example, such extended bearing support blanks can be formed that are just like the bearing supports 20, 21 shown in FIG. 2, but have a width 55 ten times the width 56 of the individual link fitting 10.

Once the appropriate bearing supports 20, 21 are mated and bonded to the layer blanks 51, 52, 53 in a stacked configuration, securing pins can be inserted into holes. Alternatively, holes can be drilled for receiving securing pins. Once the securing pins are installed in the holes, the center core assembly is complete. Thereafter an outer wrapping blank 57, formed of a similar composition to outer band 30, is installed to surround the bearing supports 20, 21 and layer blanks 51, 52, 53 as shown in FIG. 4. The outer wrapping blank 57 is preferably bonded to the internal subassembly by a cured adhesive.

Once the fully assembled link blank 60 is cured, the assembly can be cut along separation lines 35. The separation lines 35 are spaced a distance from one another, which should be roughly the equivalent to the desired individual link fitting width 56. Then, the individual composite link fittings 10 can undergo a finish trimming to provide a more precise finished width for each completed link fitting 10. Thereafter, the individual link fittings 10 can undergo further finishing, such as receiving further outer coatings and inserting bushings 29 in the bearing bores 28.

Figure 5:
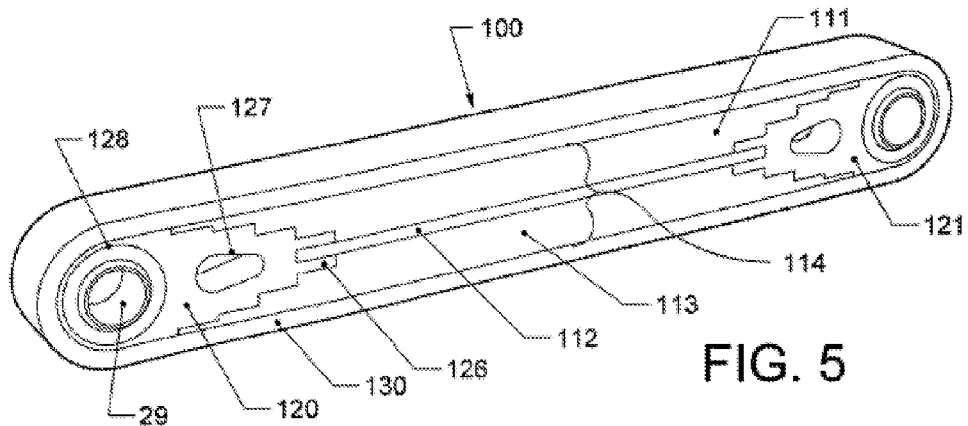
FIG. 5 is a perspective view of a composite link fitting in accordance with further aspects of the disclosed technologies.

FIG. 5 shows a composite link fitting 100 in accordance with further aspects of the disclosed technologies. The link fitting 100 includes bearing supports 120, 121 disposed at two opposed ends of the fitting 100. Between the bearing supports 120, 121 is an inner laminate core 114 formed from a layered subassembly 111, 112, 113. Also, the link fitting 100 includes an outer band 130 that wraps around the perimeter of the inner laminate core 114 and the bearing supports 120, 121.

Figure 6:
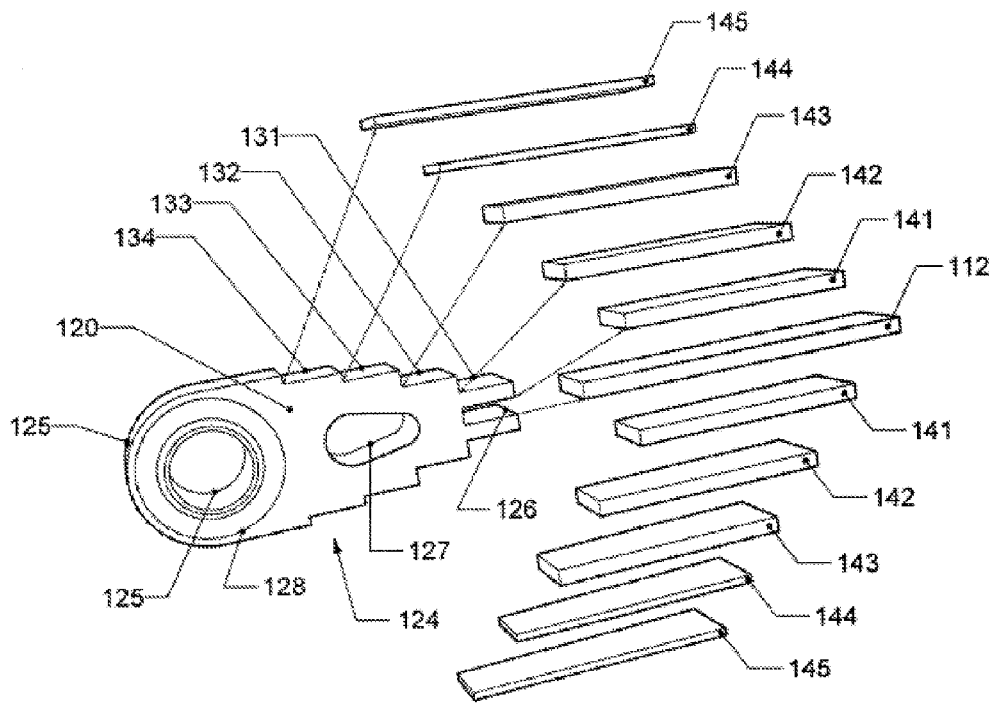
FIG. 6 is an exploded perspective view of the left portion of the composite link fitting of FIG. 5.
Figure 7:
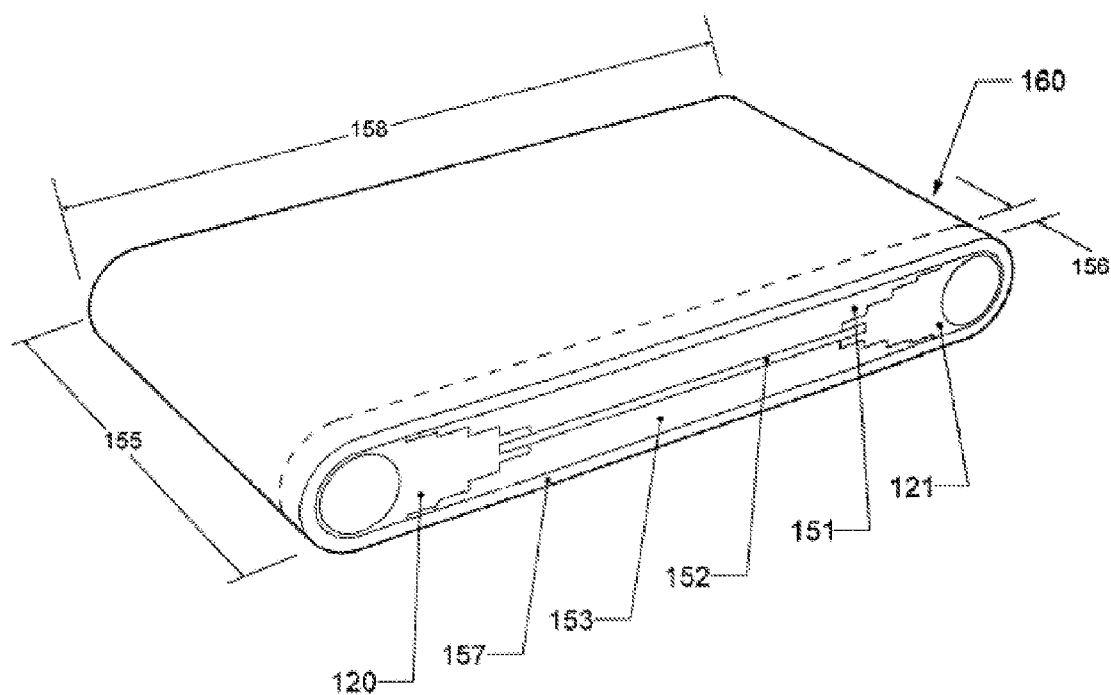
FIG. 7 is a perspective view of a blank for forming a series of composite link fittings in accordance with further aspects of the disclosed technologies.

As more clearly visible in FIG. 6, the bearing supports 120, 121 each can include two separate stepped portions 124, a curved outer portion 125, a center recess 126 and a bearing bore 128 extending from one lateral side of the bearing support 120, 121 to an opposed lateral side thereof. The bearing bore 128 can include a bushing or spherical bearing 29 in order to minimize wear on the bearing bore 128 when a bolt, rod or other structure is received therein.

The stepped portions 124 of the bearing supports 120, 121 symmetrically project away from the bearing bore 128, with the flat surfaces 131-134 generally parallel to a longitudinal axis of the link fitting 100. Such a longitudinal axis extends through the center of each bearing bore 128 and each center recess 126 of the two bearing supports 120, 121.

FIG. 6 shows an exploded view of the left side of the composite link fitting 100 from FIG. 5, but without the outer band 130. The bearing supports 120, 121 each include two separate sets of steps defining two stepped portions 124. Each stepped portion 124 includes a series of flat surfaces 131-134 at different levels relative to one another, connected by risers between adjacent levels, forming a stair-like configuration. One distinction from the embodiment of FIG. 1 is that stepped portions 124 include more steps 131-134. Also, the combined lengths of the steps 131-134 for a single stepped portion 124 greatly exceed the depth of the center recess 126. It should be understood that while the depth of center recess 126 matches a longitudinal extent of the first step 131, that depth could be greater. Also, the depth of the center recess 126 need not be correlated to the longitudinal extent of any step or any number of steps. The center recess 126 receives an end portion of the central elongate layer 112 of the inner laminate core 114. Thus, the depth of the center recess should be suitable for engaging enough of the longitudinal ends of the central elongate layer 112.

Another distinction is that steps 131-134 are joined by risers of varying height. In the embodiment shown, the risers decrease in height with each riser toward the bearing bore 128. The height of each riser preferably equals the height change between corresponding graded tapers formed on the longitudinal ends of the outer laminates 111, 113.

An inner laminate core 114 is formed from three generally flat composite laminates 111, 112, 113. Each of the individual laminates 111, 112, 113 can be formed from a layered arrangement having a generally rectangular cross-section. However, rather than machining the outer laminates 111, 113 to form graded tapers, the outer laminates 111, 113 can be formed from separate sub layers 141-145. Also, each sub layer 141-145 progressively increases in length as compared to the immediately adjacent sub layer toward the central laminate 112. In contrast, each sub layer 141-145 decreases in thickness as compared to the immediately adjacent sub layer toward the central laminate 112. Thus, the height of each riser at the back of each step 131-134 should equal the thickness of the corresponding sub layer 142-145 engaged thereon, as well as a bonding adhesive.

In forming the inner laminate core 114, the central laminate 112 as well as each sub layer 141-145 of each outer laminate 111, 113 forms a distinct layer of the inner laminate core 114. In this way, the central layer 112 and two sets of sub layer laminates 141-145 are stacked alongside one another. Each of the central layer 112 and the individual layers of the two sets of sub layer laminates 141-145 have opposed axial ends that engage the two opposed bearing supports 120, 121. In this way, the axial ends of the sub layers 142-145 are seated on the stepped portions 124, while the axial ends of the central laminate 112 are disposed in the center recess 126. Preferably, the central laminate 112 has a thickness that corresponds to the gap forming the center recess 126. By forming the outer laminates 111, 113 using sub layers 141-145 of progressively varied lengths, a graded taper is formed on the longitudinal ends of outer laminates 111, 113. Such a graded taper preferably complements the stepped outer portion 124 to which it engages.

A further distinction from the prior embodiment is that each bearing support 120, 121 includes a relief bore 127 extending through the lateral thickness thereof. The inclusion of a relief bore 127 is helpful in minimizing the weight of each bearing support 120, 121 and thus the overall link fittings 100. The relief bore 127 includes a symmetrical pair-shaped design. The wider part of the pair-shape is preferably disposed toward the bearing bore 128. It should be understood that the relief bore 127 could be proportionately larger or smaller than that shown. Also, the relief bore 127 could have a different shape, such as a tear drop, a simple circle, another basic geometric shape or a unique shape, as desired.

As with the embodiment of FIG. 1, an outer band 130 can be formed from a similar laminate composition as that of the inner laminate core 114. The outer band 130 wraps around the bearing supports 120, 121 and the inner laminate core 114.

To reduce costs, the assembly process can create a link blank 160 used to form a series of individual link fittings, all at the same time, similar to the link fitting blank 60 described earlier. In this way, many individual composite link fittings can be created efficiently and in a cost effective manner. Pre-formed and stacked layered blanks 151, 152, 153 along with either a series of opposed bearing supports 120, 121 or two opposed extended bearing supports, which are all assembled and wrapped with an outer band blank 157. The blank 160 can have a width 155 that can be divided to form individual link fittings of smaller width 156. It should be understood that the overall length 158 of the blank 160 can be altered to suit the particular application for which the link fittings 100 will be applied.

Thus, a method of forming a series of individual link fittings can include the following steps. Initially, a layered arrangement of plies having a width 155 are bonded and cured to form a central layer blank 152. Then, a series of tapered bearing supports 120, 121 are placed into each end of a tooling fixture or assembly jig so that the stepped portions of the bearing supports 120, 121 and the central recesses 126 face one another. Next, the pre-cured composite central layer blank 152 is placed between the series of tapered metallic bushing 120, 121. Using adhesive, such as a film adhesive, the central layer blank 152 is secured within the central recess 126 of the bearing supports 120, 121. One side of the central layer blank 152 can be mated with a bearing support 120 first, and then the second side assembled with the other bearing support 121. Then, a shortest one 141 of the series of sub layer laminates 141-145 is placed on each opposed sides of the central layer blank 152. Thereafter, a next shortest one 142 of the series of sub layer laminates is placed over the previously applied sub layer 141. This application of further sub layers 143-145 continues from shortest to longest. Each of the second through fifth sub layers 142-145 should be made to engage one of the steps 131-134, respectively. Next, a series of external plies are wrapped around the bearing supports 120, 121 and the inner laminate core 114 in order to form an outer band blank 157. It should be understood that the top and bottom sections of the greater composite link fitting blank 160 may be assembled simultaneously, one at a time or some other fashion. Then, the composite laminated structure is cured. After being cured, the greater composite link fitting blank 160 is cut (such as along cut lines 35) into smaller sections to form multiple individual composite control rods 100. Then, the individual composite control rods 100 preferably undergo a finish trimming to provide the finished width of each composite control rod 100 to complete the part.

Although illustrative embodiments of the present disclosure have been described herein with reference to the accompanying drawings, it is to be understood that the invention is not limited to those precise embodiments and that various other changes and modifications may be effected herein by one skilled in the art without departing from the scope or spirit of the invention. Also, it will be appreciated that various of the above-disclosed and other features and functions, or alternatives thereof, may be desirably combined with various systems or applications. It will further be appreciated that various presently unforeseen or unanticipated alternatives, modifications, variations, or improvements therein may be subsequently made by those skilled in the art which are also intended to be encompassed by the disclosed embodiments and the following claims.

What is claimed is:

1. A method of forming a composite link fitting, the method including:
   joining two opposed bearing supports with an inner laminate core having a longitudinal axis extending there between, each bearing support including a bearing bore, a first stepped portion, a separate second stepped portion and a recess formed therein, the bearing bore formed as an aperture extending from one side of each bearing support to an opposed side of the bearing support, the recess extending toward the bearing bore between an extent of the first and second stepped portions to a recess bottom, wherein between the recess bottom and an inner wall of the bearing bore a bearing support thickness separates the bearing bore from the recess, the inner laminate core including a central elongate layer, a first outer layer and a second outer layer, the first and second outer layers disposed on opposed first and second sides of the central elongate layer, the first outer layer engaging the first side of the central elongate layer and a portion of the first stepped portion on each of the two bearing supports, the second outer layer engaging the second side of the central elongate layer and a portion of the second stepped portion on each of the two bearing supports, the central elongate layer including longitudinally opposed first and second ends, the first end disposed within the recess of one of the two bearing supports and the second end disposed within the recess of the other of the two bearing supports; and
   wrapping an outer band around the two bearing supports and the inner laminate core to form the composite link fitting.

2. The method of claim 1, further comprising:
   forming the inner laminate core by:
      dividing one continuous laminate sheet into at least two segments; and
      cutting a graded taper along each of two opposed edges of at least one of the at least two segments, the graded taper complimenting at least one of the first and second stepped portions.

3. The method of claim 2, further comprising:
   bonding the first and second outer layers to the central elongate layer before the joining of the two opposed bearing supports with the inner laminate core.

4. The method of claim 2, further comprising:
bonding the first and second outer layers to the central elongate layer after joining the two opposed bearing supports with the inner laminate core.

5. The method of claim 2, wherein joining the two opposed bearing supports with the inner laminate core engages the stepped portions of the bearing supports with respective graded taper of the inner laminate core.

6. The method of claim 2, wherein the joining the two opposed bearing supports with the inner laminate core includes applying an adhesive between the stepped portions of the bearing supports and the respective graded taper of the inner laminate core.

7. The method of claim 1, further comprising:
forming at least one aperture extending through the two separate stepped portions, the central elongate layer and the first and second outer layers; and
inserting a bearing pin in each at least one aperture.

8. The method of claim 1, further comprising:
heating the formed composite link fitting to set an adhesive applied between each of the two opposed bearing supports and the inner laminate core.

9. The method of claim 1, further comprising:
inserting at least one pin through each bearing support, wherein each inserted pin extends through apertures in the inner laminate core and one of the two bearing supports, the pin being inserted prior to the wrapping of the outer band.

10. A method of forming a series of composite link fittings, the method including:
joining two opposed bearing supports with an inner laminate core having a longitudinal axis extending there between, each bearing support including a bearing bore, a first stepped portion, a separate second stepped portion and a recess formed therein, the bearing bore formed as an aperture extending from one side of each bearing support to an opposed side of the bearing support, the recess extending toward the bearing bore between an extent of the first and second stepped portions to a recess bottom, wherein between the recess bottom and an inner wall of the bearing bore a bearing support thickness separates the bearing bore from the recess, the inner laminate core including a central elongate layer, a first outer layer and a second outer layer, the first and second outer layers disposed on opposed first and second sides of the central elongate layer, the first outer layer engaging the first side of the central elongate layer and a portion of the first stepped portion on each of the two bearing supports, the second outer layer engaging the second side of the central elongate layer and a portion of the second stepped portion on each of the two bearing supports, the central elongate layer including longitudinally opposed first and second ends, the first end disposed within the recess of one of the two bearing supports and the second end disposed within the recess of the other of the two bearing supports;
wrapping an outer band around the two bearing supports and the inner laminate core to form a composite link fitting blank; and
cutting the formed composite link fitting blank longitudinally to form the series of composite link fittings.

11. The method of claim 10, further comprising:
forming the inner laminate core by:
dividing one continuous laminate sheet into at least two segments; and
cutting a graded taper along each of two opposed edges of at least one of the at least two segments, the graded taper complimenting at least one of the first and second stepped portions.

12. The method of claim 11, further comprising:
bonding the first and second outer layers to the central elongate layer before the joining of the two opposed bearing supports with the inner laminate core.

13. The method of claim 11, further comprising:
bonding the first and second outer layers to the central elongate layer after joining the two opposed bearing supports with the inner laminate core.

14. The method of claim 11, wherein joining the two opposed bearing supports with the inner laminate core engages the stepped portions of the bearing supports with respective graded taper of the inner laminate core.

15. The method of claim 11, wherein the joining the two opposed bearing supports with the inner laminate core includes applying an adhesive between the stepped portions of the bearing supports and the respective graded taper of the inner laminate core.

16. The method of claim 10, further comprising:
forming at least one aperture extending through the two separate stepped portions, the central elongate layer and the first and second outer layers; and
inserting a bearing pin in each at least one aperture.

17. The method of claim 10, further comprising:
heating the composite link fitting blank to set an adhesive applied between each of the two opposed bearing supports and the inner laminate core.

18. The method of claim 10, further comprising:
inserting at least one pin through each bearing support, wherein each inserted pin extends through apertures in the inner laminate core and one of the two bearing supports, the pin being inserted prior to the wrapping of the outer band.

* * * * *